United States Patent [19]

van der Lely

[11] 4,232,616
[45] Nov. 11, 1980

[54] DEVICE FOR SELECTIVELY APPLYING LIQUID MANURE ONTO OR INTO THE GROUND

[76] Inventor: Cornelis van der Lely, 7, Brüschenrain, Zug, Switzerland

[21] Appl. No.: 933,481

[22] Filed: Aug. 14, 1978

Related U.S. Application Data

[63] Continuation of Ser. No. 752,864, Dec. 21, 1976, abandoned.

[30] Foreign Application Priority Data

Dec. 22, 1975 [NL] Netherlands ............................. 7514909

[51] Int. Cl.³ .......................... A01C 23/00; F04D 1/04
[52] U.S. Cl. ........................................ 111/7; 239/146; 239/172; 415/121 B
[58] Field of Search ..................... 111/6, 7; 241/46.08, 241/46.11, 46 R; 239/146, 147, 148, 172, 689, 681, 679, 675, 674, 668, 664, 663, 662, 651, 650, 159, 163; 415/121 B

[56] References Cited

U.S. PATENT DOCUMENTS

| 3,155,046 | 11/1964 | Vaughan | 415/121 B X |
|---|---|---|---|
| 3,185,100 | 5/1965 | Secrest | 415/121 B |
| 3,396,912 | 8/1968 | Sahlstrom | 239/689 X |
| 3,793,967 | 2/1974 | Vandenberg | 111/7 |
| 4,013,224 | 3/1977 | Carter | 239/148 |
| 4,014,271 | 3/1977 | Rohlf et al. | 111/7 |

FOREIGN PATENT DOCUMENTS

| 55266 | 8/1912 | Austria | 239/163 |
|---|---|---|---|
| 76698 | 3/1948 | Czechoslovakia | 239/662 |
| 73287 | 6/1893 | Fed. Rep. of Germany | 239/662 |
| 930841 | 6/1955 | Fed. Rep. of Germany | 241/46.08 |
| 1386236 | 12/1965 | France | 111/6 |
| 1464151 | 12/1966 | France | 239/159 |
| 2261697 | 9/1975 | France | 111/6 |
| 447165 | 11/1974 | U.S.S.R. | 241/46 R |

Primary Examiner—Steven A. Bratlie
Attorney, Agent, or Firm—Penrose Lucas Albright

[57] ABSTRACT

A manure spreader, in combination with a tractor, consisting of a tank with a horizontal axis aligned with the normal movement of the tractor which tows it. A comminuter is provided between the tractor and the tank which has an inlet from the tank near its bottom and four rotating flail blades curved forwardly near their ends. A pair of opposite outlets lead to hoses which selectively may be connected to ejectors on a cultivator carried by the tractor's three-point hitch or the hoses may be connected to pipes leading to spray-type spreaders disposed near the tractor. In one embodiment, the inlet to the comminuter is tangential to a circumference circumscribed by ends of the flail blades with a knife disposed in a lower portion of same. In another embodiment, the entrance into the comminuter is about one-third the distance up from the bottom of its casing. A pump which may either pull a vacuum or place a pressure on the tank may be mounted on the tank's frame. Alternatively, the tank may be filled by gravity through a closeable opening on its top. In the embodiment wherein the tank pressure is controlled by a pump, the opening is on the tank's bottom and the outlet duct therefrom extends from a cylindrical flange for this closeable opening in the tank's bottom.

84 Claims, 10 Drawing Figures

DEVICE FOR SELECTIVELY APPLYING LIQUID MANURE ONTO OR INTO THE GROUND

RELATED APPLICATIONS

This is a continuation of Ser. No. 752,864 filed Dec. 21, 1976 now abandoned.

The invention relates to a device or implement for applying liquid manure onto or into the ground, which liquid manure will usually contain solid undissolved organic constituents, the device or implement comprising a container tank for material to be spread, material delivery means having one or more outlet ports, and a reducing mechanism located between the container tank and the outlet port or ports to comminute solid undissolved constituents of material to be spread, the mechanism being furnished with at least one yieldably mounted rotary flail. The device or implement is optionally usable in combination with a soil cultivating implement in which case said soil cultivating implement carries injectors arranged to inject material from said container tank principally into the ground.

A general object of the invention is the provision of a simple spreading implement that can carry a large bulk supply of liquid material, such as organic manure mixture containing solid undissolved constituents, the implement being furnished with a mechanism to comminute such constituents down to a spreadable size at which they will not block the ducts that carry the material to an outlet port or ports, and being capable of spreading material principally onto the ground by way of spreading members or principally into the ground by way of injectors carried by a soil cultivating implement that is optionally usable in combination with the spreading implement. A further object of the invention is the provision of a simple but effective reducing mechanism for comminuting the solid undissolved constituents, such mechansim comprising flails that are yieldably mounted to avoid damage by impacts against stones and like hard foreign bodies that may contaminate the liquid manure mixture.

For a better understanding of the invention, and to show how the same may be carried into effect, reference will now be made, by way of example, to the accompanying drawings, in which:

Referring to FIGS. 1 to 6 of the accompanying drawings, the spreading implement that is illustrated therein is intended primarily for distributing liquids containing undissolved solids, such as organic manure slurry and other organic manure mixtures, into or onto the soil or both. The implement comprises a cylindrical tank 1 having a longitudinal axis which is horizontally or substantially horizontally disposed, said tank 1 being secured to a supporting frame 2 having two beams 3 and 4. Brackets 16 and 17 that are fastened to the beams 3 and 4 actually support the cylindrically curved surface of the tank 1. Those portions of the two beams 3 and 4 that offer support to the tank 1 by way of the brackets 16 and 17 extend parallel to one another close to the bottom of the tank 1 but, at their leading ends with respect to the intended direction of straight forward operative travel of the implement that is indicated by an arrow 83 in FIG. 1 of the drawings, they are bent over towards one another to form forwardly convergent portions 5 and 6. The leading ends of the forwardly convergent portions 5 and 6 are rigidly interconnected by a substantially vertical plate 7. The rear ends of the beams 3 and 4 with respect to the direction 83 carry depending brackets that are in substantially vertical register with the overlying tank-supporting brackets 16 and said depending brackets are perpendicularly interconnected by a shaft 8 that extends substantially horizontally perpendicular to the direction 83. Axle supports 9 and 10 are pivotally connected to the opposite ends of the shaft 8 and carry corresponding pairs of substantially horizontal front and rear axle shafts upon which four ground wheels 11, 12, 13 and 14 are respectively rotatably mounted.

Figure 1:
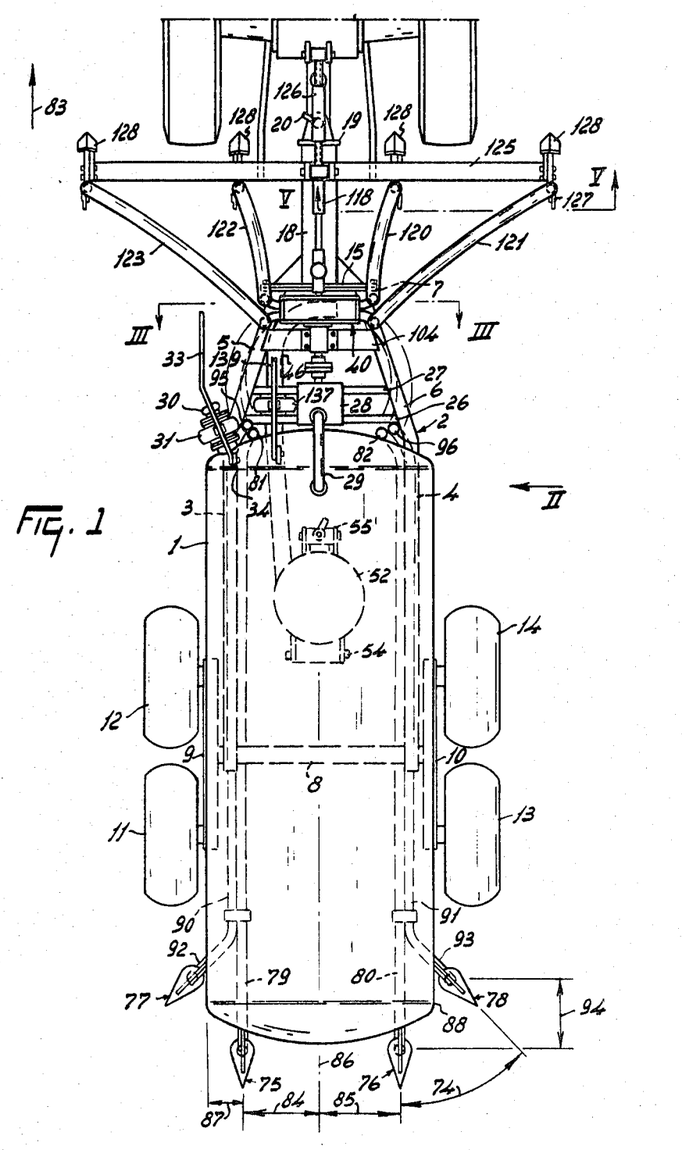
FIG. 1 is a plan view of a spreading implement in accordance with the invention connected to the rear of an agricultural tractor.
Figure 2:
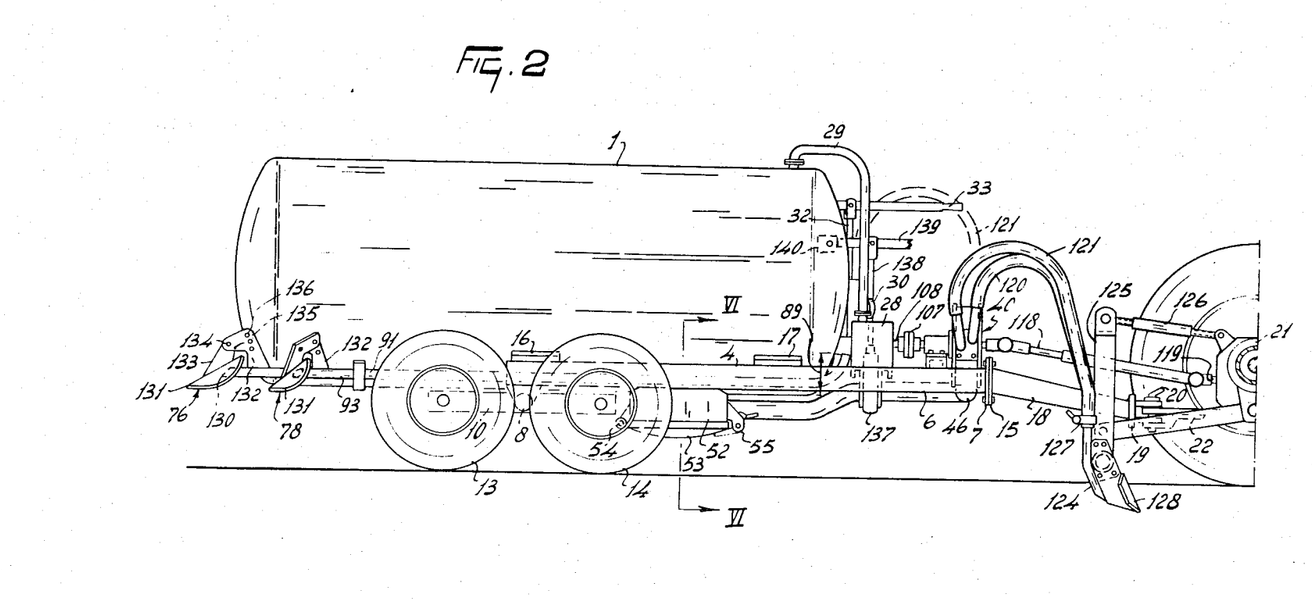
FIG. 2 is a side elevation as seen in the direction indicated by an arrow II in FIG. 1.

A second substantially vertical plate 15 is firmly but releasably secured to the front of the plate 7 by bolts, said plate 15 carrying a draw bar 18 the leading end of which is provided with a coupling member 19 that is arranged for connection, in the simple manner that can be seen in FIGS. 1 and 2 of the drawings, to a towing eye 22 of a vehicle, such as the tractor 21 that is illustrated, by a substantially vertically disposed pivotal hitch pin 20 or the like. Supporting beams 26 and 27 interconnect the forwardly convergent portions 5 and 6 of the beams 3 and 4 in parallel, but spaced, relationship with each other and substantially horizontally perpendicular relationship with the direction 83, said supporting beams 26 and 27 carrying a pump 28 at a location substantially midway along their lengths. A duct 29 interconnects the pump 28 and the interior of the tank 1, the duct 29 opening into said tank 1 at substantially the top thereof. The front of the tank 1 is provided, towards the bottom thereof and nearer to one lateral side of the tank than it is to the other (see FIG. 1), with an inlet tube 30 furnished with a shut-off valve 31. An upright control rod 32 pivotally interconnects the shut-off valve 31 and a control lever 33 that extends generally forwardly with respect to the direction 83 from a pivotal mounting 34 near the front of the tank 1 and towards the top thereof.

Figure 3:
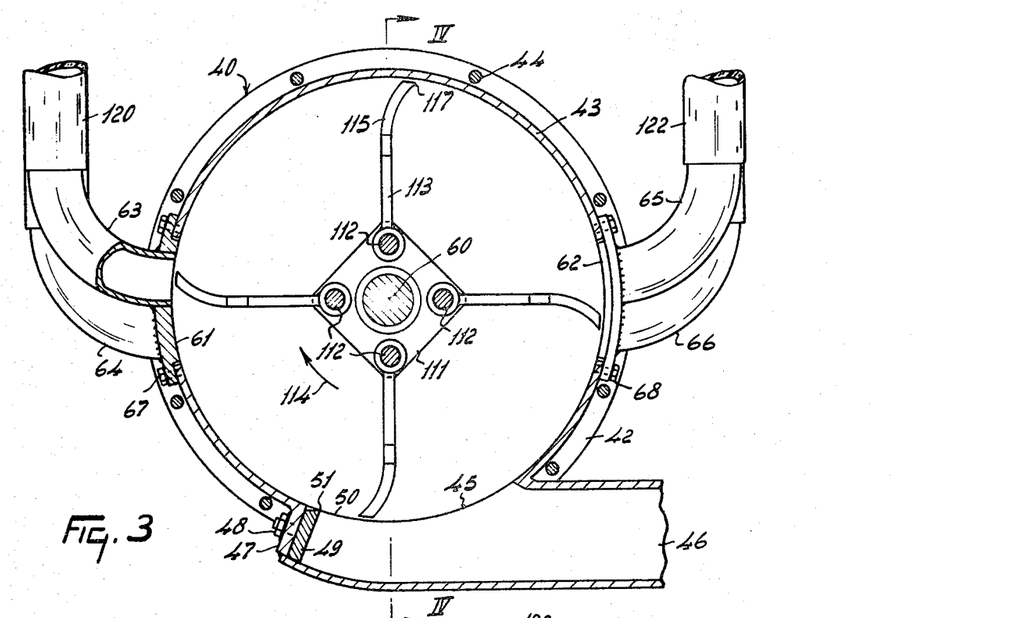
FIG. 3 is a section, to an enlarged scale, taken on the line III—III in FIG. 1.

A reducing or cutting mechanism 40 is arranged on the forwardly convergent portions 5 and 6 of the beams 3 and 4 immediately to the rear of the vertical plate 7. The mechanism 40 comprises two circular plates 41 and 42 (FIGS. 3 and 4), the general planes of which are disposed in substantially vertical parallel relationship with one another and substantially perpendicular relationship with the direction 83. The two plates 41 and 42 are spaced apart from one another in the direction 83 and edge portions thereof are drawn into sealing relationship with a cylindrical sheath 43 by a plurality, such as eight, of clamping bolts 44. An inlet opening 45 is formed through the cylindrical sheath 43 at substantially the bottom of the latter and communicates with an inlet duct 46 which, as seen in FIG. 3 of the drawings, extends substantially tangentially with respect to the cylindrical sheath 43. The sheath 43 is integrally formed with a projection 47 that extends substantially radially with respect to the substantially horizontally disposed central or longitudinal axis 60 of the sheath 43, said projection 47 being located in register with the extreme end of the inlet duct 46 and said projection 47 and duct 46 being welded or otherwise rigidly secured to one another at the registering location. A bolt 48 releasably secures a cutting blade 49 to that side of the projection 47 which faces internally of the duct 46, said blade having a cutting edge 51 that registers, or substantially registers, with a cylindrical figure 50 containing the internal curved surface of the sheath 43 of the reducing or cutting mechanism 40.

The end of the duct 46 that is remote from the mechanism 40 is connected to an outlet cylinder 52 of the tank 1 that projects substantially vertically downwards for a short distance from the cylindrically curved surface of the tank 1 at the bottom of the latter. The longitudinal axis of the outlet cylinder 52 is thus vertically or substantially vertically disposed, said outlet cylinder 52 affording a downward extension of the bottom of the tank 1. The lowermost end of the outlet cylinder 52 is closed by a domed cover 53 which is openable by turning it downwardly relative to the cylinder 52 about a substantially horizontal pivot 54 that extends substantially perpendicular to the direction 83. A fluid seal is, of course, provided between the cover 53 and the mouth of the outlet cylinder 52 and said cover 53 is normally maintained in its sealingly closed position by a locking latch 55 that may be of a construction which is known per se.

Figure 4:
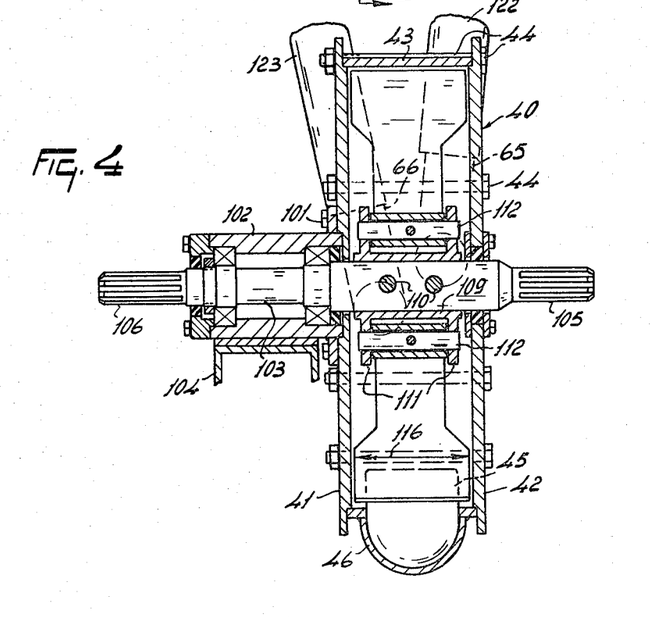
FIG. 4 is a section taken on the line IV—IV in FIG. 3.
Figure 5:
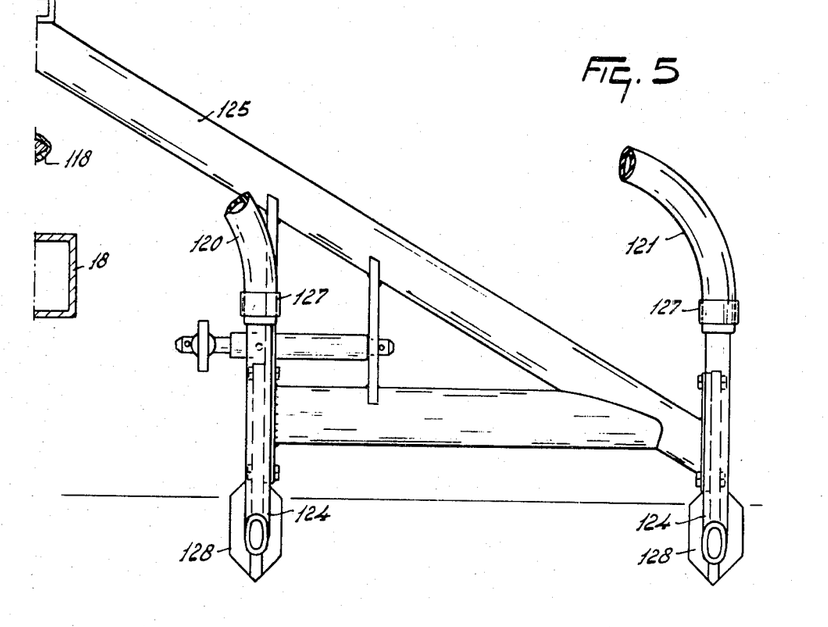
FIG. 5 is a section, to an enlarged scale, taken on the line V—V in FIG. 1.
Figure 6:
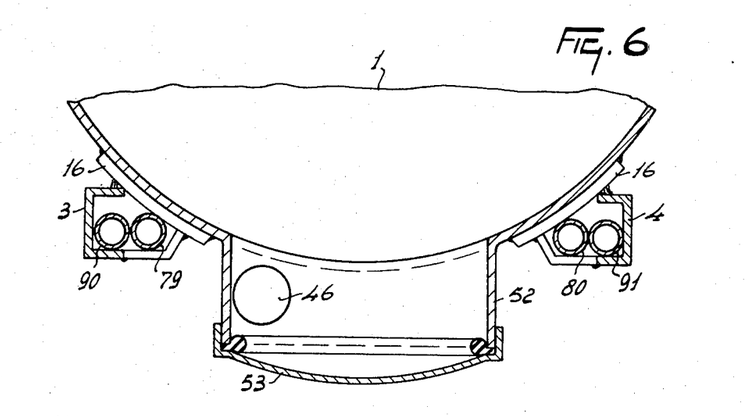
FIG. 6 is a section, to an enlarged scale, taken on the line VI—VI in FIG. 2.

As previously mentioned, the reducing or cutting mechanism 40 is so arranged that its parallel plates 41 and 42 are vertically or substantially vertically disposed as a consequence of which the central or longitudinal axis 60 of its cylindrical sheath 43 is horizontally or substantially horizontally disposed. Delivery nozzles 61 and 62 open from opposite sides of the sheath 43 at substantially the same horizontal level as the axis 60 of that sheath. The delivery nozzles 61 and 62 are of substantially symmetrically identical construction, the nozzle 61 being provided with two delivery ducts 63 and 64 and the nozzle 62 being provided with two delivery ducts 65 and 66. Small bolts 67 sealingly secure the delivery nozzle 61 to the mouth of an opening in the sheath 43 and, similarly, small bolts 68 sealingly secure the nozzle 62 to the mouth of a further opening in the sheath 43.

Substantially the rear end of the implement with respect to the direction 83 is provided with four spreading members 75, 76, 77 and 78. The spreading members 75 and 76 are arranged at the rearmost ends of delivery pipes 79 and 80 that extend substantially parallel to the direction 83 along the bottom of the tank 1, said pipes 79 and 80 being formed at the front of the tank 1 with upwardly bent-over portions 81 and 82 that are gently convergent in an upward direction. As can be seen in FIG. 1 of the drawings, the two spreading members 75 and 76 are arranged just behind the rear end of the tank 1 with respect to the direction 83 and are spaced by equal distances 84 and 85 from a vertical plane 86 of substantial symmetry of the implement that extends parallel to the direction 83. Again as seen in the plan view of FIG. 1, each of the equal distances 84 and 85 has a magnitude which is substantially twice that of the distance 87 by which each of the two spreading members 75 and 76 is spaced from the respective neighboring lateral side of the tank 1. The upwardly bent-over portions 81 and 82 of the delivery pipes 79 and 80 that are located at the front of the tank 1 extend throughout a vertical distance 89 (FIG. 2) from the bottom of the tank 1 whose magnitude is substantially one-fifth of that of the diameter of the cylindrical tank 1.

The spreading members 77 and 78 are arranged at the rearmost ends, with respect to the direction 83, of delivery pipes 90 and 91 which pipes extend, throughout the greater parts of their lengths, alongside the delivery pipes 79 and 80 respectively. However, near their rearmost ends, the delivery pipes 90 and 91 are bent over obliquely outwardly to form portions 92 and 93. The portions 92 and 93 actually carry the spreading members 77 and 78 and their lengths are such that, as seen in the plan view of FIG. 1, the two members 77 and 78 are located just beyond the opposite lateral sides of the tank 1. The longitudinal axes of each of the two pipe portions 92 and 93 are inclined to the vertical plane 86 of substantial symmetry of the implement by equal angles 74 (FIG. 1) that advantageously, as illustrated, have magnitudes of substantially 45°. The two spreading members 77 and 78 are in advance, with respect to the direction 83, of the extreme rear end of the tank 1 by a distance 94 (FIG. 1). The two delivery pipes 90 and 91, like the delivery pipes 79 and 80, have upwardly bent-over portions 95 and 96 at their leading ends, said portions 95 and 96 being located alongside the similarly disposed portions 81 and 82 of the respective pipes 79 and 80 so as to cover the same vertical distance 89 (FIG. 2) as do the pipe portions 81 and 82.

Bolts 101 (FIG. 4) secure the rear plate 41 of the reducing or cutting mechanism 40 to a housing 102 of horizontal bearings which rotatably support a substantially horizontal shaft 103 having a longitudinal axis (axis of rotation) which is coincident with the central or longitudinal axis 60 of the cylindrical sheath 43. The bottom of the bearing housing 102 is secured to a support beam 104 that rigidly interconnects the forwardly convergent portions 5 and 6 of the beams 3 and 4. It can be seen from FIG. 4 of the drawings that the shaft 103 passes right through the reducing or cutting mechanism 40, being entered through central openings in the two circular plates 41 and 42 of that mechanism which openings are provided with fluid seals. The leading end of the shaft 103 that projects forwardly with respect to the direction 83 from the front of the mechanism 40 is formed with coupling splines 105. Similarly, the rearmost end of the shaft 103 that projects from the back of the bearing housing 102 is formed with coupling splines 106. The coupling splines 106 are drivingly connected by a coupling member 107, which may incorporate an overload slip clutch or other overload release mechanism, to a rotary input shaft 108 that projects forwardly from the front of the pump 28.

That portion of the shaft 103 which is located internally of the mechanism 40 between its circular plates 41 and 42 is provided with a mounting 109 which is fastened to the shaft by a pair of transverse pins 110 entered through bores in the shaft. The mounting 109 comprises two square plates 111 (see FIG. 3) with corners which are interconnected by four shafts 112 that all extend parallel to the axis 60 at 90° intervals around that axis. The shafts 112 are turnably mounted in the aligned holes that are formed close to the corners of the plates 111 and each shaft 112 is provided, between said plates 111, with a corresponding cutting member in the form of a flail 113. Each flail 113 is thus capable of turning between the two plates 111 about the axis of the shaft 112 to which it is secured. The four flails 113 together afford rotatable cutting means and the end of each of them that is remote from the corresponding shaft 112 is provided with a blade 115 that is orientated forwardly in a substantially regularly curved manner with respect to the intended direction of operative rotation 114 of the shaft 103. Each blade 115 has a width 116 (FIG. 4) tht is only marginally less than the distance between the inner surfaces of the two circular plates 41 and 42. The width 116 is substantially one-quarter of the internal diameter of sheath 43. Each flail 113 has such a length that, when the inner portion thereof is disposed radially with respect to the axis 60 as shown in FIGS. 3 and 4 of the drawings, a cutting edge 117 at the outer end of the corresponding blade 115 is located very close to the cylindrical figure 50 which contains the internal curved surface of the sheath 43. Thus, when each flail 113 has the disposition just described, the cutting edge 117 of its blade 115 will pass very close to the cutting edge 51 of the blade 49 when the shaft 103 is rotated. The coupling splines 105 at the leading end of the shaft 103 are intended to be placed in drive connection with a source of rotary power and, with the arrangement that is shown by way of example in FIGS. 1 to 6 of the accompanying drawings, said coupling splines 105 are placed in driven connection with the power take-off shaft 119 of the operating tractor 21 by way of an intermediate telescopic transmission shaft 118 that is of a construction which is known per se having universal joints at its opposite ends.

The delivery ducts 63 to 66 that issue from the delivery nozzles 61 and 62 of the reducing or cutting mechanism 40 are connected to flexible delivery ducts in the form of respective hoses 120, 121, 122 and 123. The ends of the hoses 120 to 123 that are remote from the mechanism 40 are connected by clips 127 or like members to four injectors 124 that form parts of a soil cultivating implement that is generally indicated by the reference 125. The soil cultivating implement 125 includes a coupling member or trestle that is of generally triangular configuration when seen in front or rear elevation, said coupling member or trestle being constructed and arranged to enable it to be connected, in a manner that is generally known per se, to the three-point lifting device or hitch 126 that is provided at the rear of the tractor 21.

Each of the four injectors 124 is of tubular formation and is arranged at the rear, with respect to the direction 83, of a corresponding one of four injection tines 128. When required, the clips 127 or the like can be loosened to enable the flexible hoses 120 to 123 inclusive to be detached from the upper ends of the corresponding injectors 124. Said hoses 120 to 123 can then be repositioned in the manner that is shown in broken lines in FIG. 2 of the drawings for the hose 121, their free ends being connected by the clips 127 or the like to the upwardly projecting open ends of the portions 81, 82, 95 and 96 of the four delivery pipes 79, 80, 90 and 91 that lead to the four spreading members 75 to 78 inclusive.

The four spreading members 75 to 78 inclusive are of identical, or at least very similar, construction and each of them, as is shown for the spreading member 76, has a convex distribution plate 131 arranged with its convex side facing a delivery port 130 that is afforded by the end of the pipe 79, 80, 90 or 91 concerned. Each distribution plate 131 is carried by a corresponding support plate 133 and said support plate is turnably connected by a pivot pin 134 to a bracket 132 fastened to the respective delivery pipe 79, 80, 90 or 91. Each support plate 133 is formed with a hole at a distance from the corresponding pivot pin 134 and each bracket 132 is formed with a curved row of holes 135 that are at the same distance from said pivot pin 134 as is the hole in the support plate 133 concerned, all of them being equidistant from the respective pivot pin 134. Locking pins or bolts 136 are provided for entry through the holes in the support plates 133 and the holes 135 in their brackets 132 that are chosen to register therewith and it will be realized that the support plates 133, and thus the distribution plates 131, are angularly adjustable about the axes defined by the pivot pins 134, the locking pins or bolts 136 being provided to retain said plates 131 and 133 in chosen angular positions about those axes.

The spreading implement that has been described with reference to FIGS. 1 to 6 of the drawings is particularly suitable for use in the distribution of liquid, or principally liquid, organic manure. The manure can be spread principally into the ground by the injectors 124 that are carried by the tines 128 or, as an alternative, principally onto the ground by way of the four spreading members 75 to 78 inclusive. The tank 1 is filled with liquid or semi-liquid manure/slurry that is to be distributed by suction, the pump 28 being driven so as to create a partial vacuum in the interior of the tank 1 by way of the duct 29. A flexible hose may be connected to the inlet tube 30 of the tank 1 and may have the end thereof that is remote from said inlet tube immersed in a slurry tank, manure settling pit or the like from which the material that is to be spread is to be derived. The shut-off valve 31 is, of course, opened to allow the material to flow into the inlet tube 30 under the action of the partial vacuum produced in the tank 1 by the pump 28. The control lever 33 can be manipulated from the driving seat of the tractor 21 for this purpose. The duct 46 that interconnects the outlet cylinder 52 of the tank 1 and the reducing or cutting mechanism 40 is provided, just in front of the tank 1, with a shut-off valve 137 which valve is pivotally connected by an upright rod 138 to a forwardly projecting control lever 139, the rearmost end of which is turnably connected to the front of the tank 1 by a pivotal mounting 140. The control lever 139, like the control lever 33, is accessible to the driver of the tractor 21 and, when the tank 1 is to be filled in the general manner that has just been described, the lever 139 is operated to close the shut-off valve 137, the valve 31 being opened for filling purposes. The pump 28 is conveniently, as described and illustrated, driven from the power take-off shaft 119 of the tractor 21 by way of the intermediate telescopic transmission shaft 118 having universal joints at its opposite ends. Once the tank 1 is full, or has been filled to the required extent, the shut-off valve 31 is closed and the filling hose (not shown) that cooperates with the inlet tube 30 is removed. The tractor 21 then tows the implement to the field or other land into or onto which the material in the tank 1 is to be spread, the soil cultivating implement 125 being mounted on the three-point lifting device or hitch 126 of the tractor 21 if the injectors 124 are to be used to introduce the material principally into, rather than onto, the soil. It will be realized that, if the spreading members 75 to 78 inclusive are to be used as an alternative, the soil cultivating implement 125 need not be carried by the tractor 21. However, upon the assumption that the implement 125 is to be used, the clips 127 or the like are used to connect the free ends of the hoses 120 to 123 firmly but releasably to the upper ends of the four tubular injectors 124. A control (not shown) of the pump 28 is used to connect the duct 29 to the pressure or delivery side thereof rather than to the suction or inlet side thereof so that, as soon as the pump 28 is driven, air under pressure is delivered to an upper region of the interior of the tank 1 by the duct 29. Thus, the valve 31 remaining closed and the valve 137 being opened, the material within the tank 1 is caused to flow from the outlet cylinder 52 thereof via the duct 46 and its open valve 137 to the bottom of the reducing or cutting mechanism 40.

As previously described, the shaft 103 which transmits drive to the pump 28 is driven from the power take-off shaft 119 of the tractor 21 and operates the moving parts of the mechanism 40 since it passes axially through that mechanism. Referring particularly to FIGS. 3 and 4 of the drawings, it will be evident that material entering the mechanism 40 from the duct 46 will sooner or later leave the interior of said mechanism by way of the delivery nozzles 61 and 62 which lead to the four hoses 120 to 123 inclusive. The material from the duct 46 enters the interior of the mechanism 40 by way of the inlet opening 45 and is then subject to the action of the flails 113 which are rotating quite rapidly around the axis 60 in the direction 114. The cutting edges 117 of the flail blades 115 cooperate successively with the cutting edge 51 of the fixed blade 49 and cut up or otherwise comminute solid undissolved constituents of the liquid or semi-liquid material such as straws, lumps or solid organic manure, plant debris and so on. In fact, a somewhat scissor-like action is produced between the cutting edges 117 of the flail blades 115 and the cutting edge 51 of the fixed blade 49. The flails 113 positively revolve the material entering the mechanism 40 from the duct 46 around the axis 60 in the direction 114 so that any undissolved solids which are too large to pass into the delivery ducts 63 to 66 inclusive cannot remain more than instantaneously in blocking relationship with the entrances to those ducts but are positively moved on by the flails 113 so as to be subject to further cutting action by the co-operating edges 117 and 51. The rotating flails 113 exert centrifugal forces upon the material received in the mechanism 40 from the duct 46 so that solid constituents thereof, in particular, tend to move principally alongside the internal curved surface of the sheath 43 and are therefore repeatedly subject to the action of the co-operating cutting edges 117 and 51. The centrifugal forces also co-operate with the positive delivery pressure in the duct 46 in feeding the liquid constituents of the material, and solid constituents that are sufficiently small, into the delivery ducts 63 to 66 inclusive. Any solid constituents that get caught momentarily against the edges of the mouths of the ducts 63 to 66 are substantially instantaneously subject to further cutting action by the edges 117 of the moving flail blades 115 and even quite large solid constituents of the material that is received in the mechanism 40 from the duct 46 are quite quickly cut up or disintegrated or both by impact or otherwise comminuted or both until they are sufficiently small to pass readily through the ducts 63 to 66 inclusive without blocking those ducts. Since there is no significant reduction in diameter, if any, of the fluid paths between the ducts 63 to 66 inclusive and the delivery ends of the injectors 124 or the delivery ports 130 of the spreading members 75 to 78 inclusive, it is very rare indeed that any blockage of a more than momentary nature will occur downstream of the reducing or cutting mechanism 40. This is conducive to a uniform spreading of the material at a regular volume thereof per unit time by either the injectors 124 or the spreading members 75 to 78.

In order to enhance the scissor-like cutting effect that is produced by co-operation of the edges 117 with the edge 51, the flail blades 115, and thus their cutting edges 117, may be inclined at a few degrees to the axis 60 throughout with width 116 (FIG. 4). The edges 117 will thus be in non-perpendicular relationship with the general planes of the two circular plates 41 and 42, rather than being disposed at 90° thereto as is shown in FIGS. 3 and 4 of the drawings, and each successive edge 117 therefore co-operates with the cutting edge 51 of the fixed blade 49 with a progressive "end-to-end" action in the manner of a pair of scissors rather than said edges coming instantaneously into register throughout their lengths as occurs with the arrangement that has been described with reference to FIGS. 3 and 4 of the drawings. With this illustrated arrangement, the comminuting action upon the solid constituents of the material that is to be spread is produced more by the flail blades 115 beating the solid constituents against the fixed blade 49 than it is by the scissor-like action that has been discussed above.

Since the soil cultivating implement 125 is coupled to the tractor 21 by the three-point lifting device or hitch 126 independently of the spreading implement carried by frame 2 which is connected to the towing eye 22 or the like by the pivotal hitch pin 20, the soil cultivating implement 125 can be moved upwardly and downwardly entirely independently of the spreading implement because the hoses 120 to 123 inclusive are flexible and constitute movable connections between the delivery ducts 63 to 66 inclusive and the injectors 124 that are carried by the soil cultivating implement 125.

If the spreading members 75 to 78 inclusive are to be used in preference to the tubular injectors 124, the hoses 120 and 123 inclusive are disconnected from said injectors 124 in the manner discussed above and are reconnected to the portions 81, 82, 95 and 96 of the delivery pipes 79, 80, 90 and 91. Thus, when the implement is moving in the direction 83 with the valve 31 closed and the valve 137 open, the material from the interior of the tank 1 issues, under pressure, from the delivery ports 130 and impinges against the convex surfaces of the distribution plates 131. These surfaces face generally downwards whatever positions of adjustment of said plates 131 are adopted and the material is sprayed therefrom over the surface of the ground, the edges of the plates being inclined downwardly. Each distribution plate 131 spreads the material which impinges thereagainst over a predetermined width of the ground surface and the arrangement is such that even quite strong winds will not affect the distribution pattern to any disadvantageous extent. The rearmost spreading members 75 and 76 spread the material principally rearwardly of the tank 1 with respect to the direction 83 over short distances from the vertical plane 86 of substantial symmetry of the implement whereas the two spreading members 77 and 78 that are connected to the obliquely inclined pipe portions 92 and 93 spread the material which they receive principally at the opposite sides of the path of travel of the implement. The spreading pattern can be adjusted to some extent by changing the angular positions of some or all of the plates 131 and 133 about the axes of the corresponding pivot pins 134 in the manner that has been described above, the locking pins or bolts 136 being employed to maintain the newly adjusted positions of the distributing plates 131.

When the spreading implement is used in combination with the soil cultivating implement 125, said spreading implement may be considered as having outlet or delivery ports which are located at three different positions of advance with respect to the direction 83. The delivery ends of the injectors 124 constitute the foremost outlet or delivery ports with respect to the direction 83 and are located at the ends of fluid delivery means which comprises the duct 46, the reducing or cutting mechanism 40, the delivery ducts 63 to 66 inclusive and the hoses 120 to 123 inclusive. The delivery ports 130 that are located behind the rear of the tank 1 with respect to the direction 83 at the rearmost ends of the delivery pipes 79 and 80 where the spreading members 75 and 76 are located constitute the rearmost outlet or delivery ports of the implement with respect to the direction 83. The third outlet or delivery ports are those delivery ports 130 that are located at the rearmost ends of the portions 92 and 93 of the delivery pipes 90 and 91 in association with the spreading members 77 and 78 respectively, these last outlet or delivery ports being located between the leading outlet or delivery ports and the rearmost outlet or delivery ports with respect to the direction 83. Thus, when the implement is viewed in plan (FIG. 1), there are at least two outlet or delivery ports (constituted by the delivery ends of the injectors 124) at the front of the implement with respect to the direction 83 at opposite sides of the vertical plane 86 of substantial symmetry of the implement and also two outlet or delivery ports at opposite sides of said plane 86 at the rear of the implement with respect to the direction 83.

The four ground wheels 11 to 14 inclusive of the implement are large pneumatically tired wheels and are arranged in fore and aft pairs at opposite sides of the implement on the corresponding pivotally mounted axle supports 9 and 10. This arrangement enables the implement to travel quietly and with little vibration even when it has to move over rough land exhibiting an uneven surface. There is thus very little disturbance to spreading of the material from the four members 75 to 78 inclusive from mechanical vibration. Since the flails 133 in the reducing or cutting mechanism 40 are turnable relative to the shaft 103 about the axes of the respective supporting shafts 112 carried by the square plates 111, any flail 113 that encounters a hard and resistant object, such as a stone, can deflect rearwardly with respect to the direction 114 to avoid damage to its blade 115. It is noted that the rapidly repeated mechanical impacts of the flails 113 against even quite hard and resistant constituents of the material derived from the duct 46 will, unless such constituents are exceptionally unbreakable, usually result in their disintegration after a very a short period of time.

Figure 7:
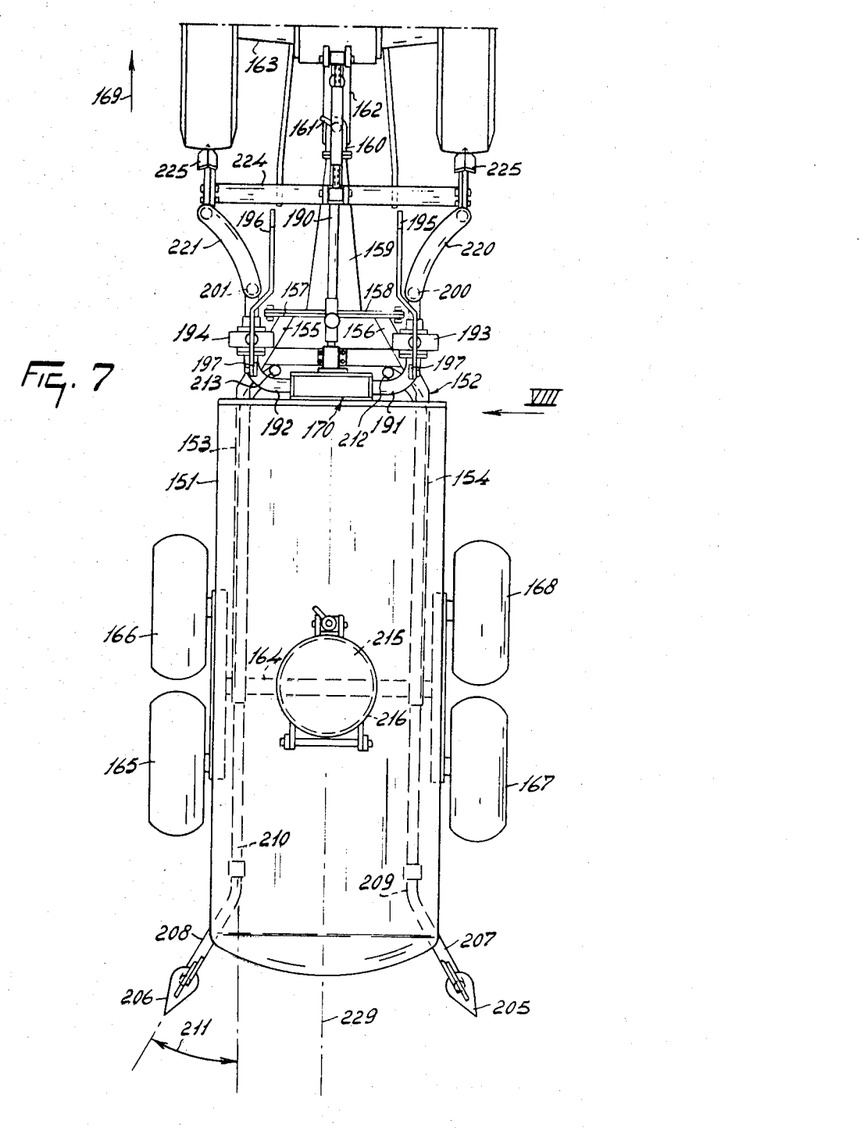
FIG. 7 is a plan view of an alternative form of spreading implement in accordance with the invention connected to the rear of an agricultural tractor.

The spreading implement that is illustrated in FIGS. 7 to 10 of the accompanying drawings has a cylindrical container in the form of a tank 151 that is supported by a frame 152 in such a way that the longitudinal axis of the cylindrical tank is horizontally or substantially horizontally disposed. The frame 152 includes two beams 153 and 154 which comprise portions that support the curved surface of the tank 151 by way of brackets, said portions being parallel to one another in horizontally spaced apart relationship and also being parallel or substantially parallel to the intended straight forward direction of operative travel of the implement that is indicated by an arrow 169 in FIG. 7 of the drawings. The beams 153 and 154 also comprise portions 155 and 156 respectively which portions converge forwardly with respect to the direction 169 from the leading ends of the portions that support the tank 151, the forwardly convergent portions 155 and 156 being rigidly interconnected, at their leading ends, by a vertical or substantially vertical plate 157 that is perpendicular or substantially perpendicular to the direction 169. The front surface of the plate 157 has a further vertical or substantially vertical plate 158 bolted to it, said plate 158 carrying a forwardly and downwardly projecting draw bar 159 to the leading end of which a coupling member in the form of a coupling fork 160 is releasably connected. The coupling fork 160 is arranged to be turnably connected to a towing eye 162 by a substantially vertical pivotal hitch pin 161. The towing eye 162 is mounted at the rear of a towing and operating vehicle such as, for example, the agricultural tractor 163 that is illustrated in FIG. 7 of the drawings. Substantially the rearmost ends of the parallel portions of the two frame beams 153 and 154 are interconnected by a substantially horizontal shaft 164 that extends perpendicular or substantially perpendicular to the direction 169. The opposite ends of the shaft 164 have corresponding axle supports pivotally connected to them and said axle supports carry fore and aft pairs of axles upon which four ground wheels 165, 166, 167 and 168 inclusive are rotatably mounted so as to lie, as seen in the plan view of FIG. 7, at opposite sides of the tank 151. The arrangement of the axle supports at the opposite ends of the shaft 164 may be similar or identical to that which has already been described with reference to the axle supports 9 and 10 of the embodiment of FIGS. 1 to 6 of the drawings and it will be seen that the four ground wheels 165 to 168 inclusive are disposed in the same way as are the previously described ground wheels 11 to 14 inclusive.

Figure 9:
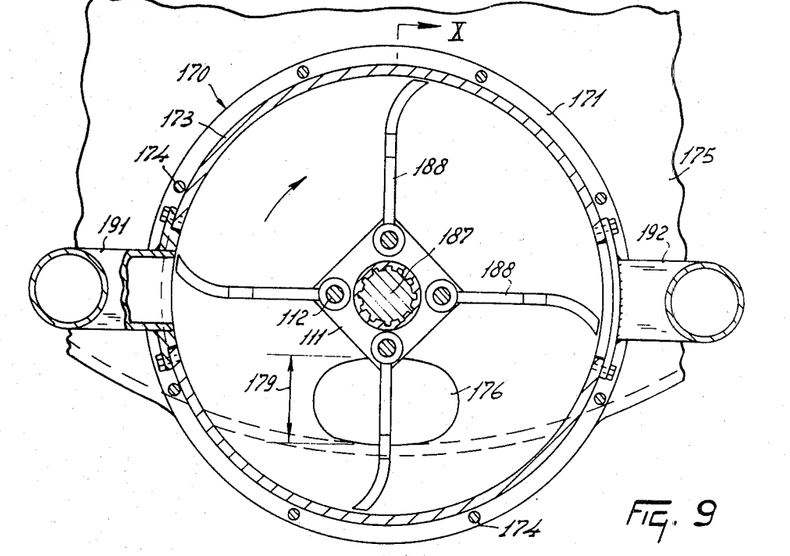
FIG. 9 is a section, to an enlarged scale, taken on the line IX—IX in FIG. 8.
Figure 10:
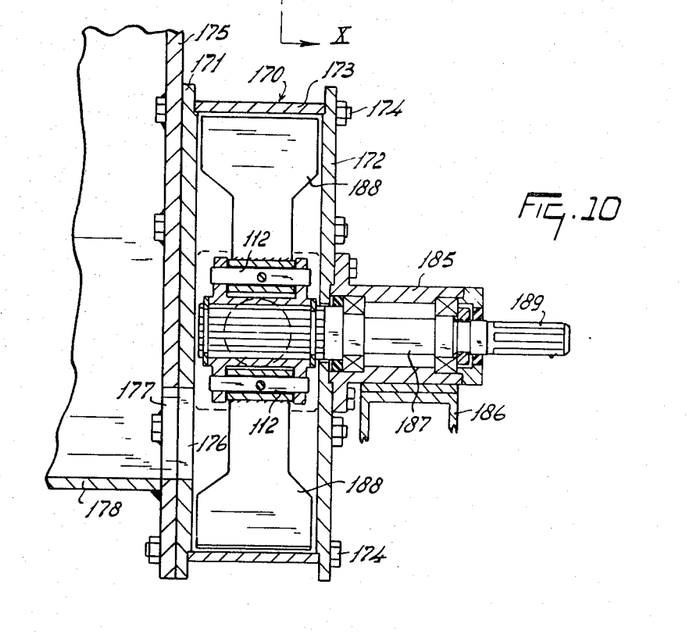
FIG. 10 is a section taken on the line X—X in FIG. 9.

A reducing or cutting mechanism 170 is provided that is similar in many respects to the mechanism 40 that has been described above in connection with FIGS. 1 to 6 of the accompanying drawings and, accordingly, some parts of said mechanism 170 are indicated by the reference numerals that have already been employed in connection with FIGS. 1 to 6 of the drawings and will not be described again in detail. The reducing or cutting mechanism 170 is located towards the front of the implement with respect to the direction 169 and, in fact, is disposed immediately in advance of a flat front wall 175 of the tank 151 at a position close to the bottom of the latter where it can be supported from said front wall 175 by some of a number of clamping bolts 174 (see FIGS. 9 and 10). As in the case of the mechanism 40, the mechanism 170 comprises two circular plates 171 and 172 between which a cylindrical sheath 173 is sealingly clamped by the bolts 174. In this embodiment, an opening 176 in the rear plate 171 of the mechanism 170 registers in open relationship with an opening 177 in the front wall 175 of the tank 151 at a level immediately above that of the bottom 178 of the cylindrically curved wall of the tank. FIG. 9 of the drawings shows that both of the openings 176 and 177 are of generally oval shape and have a vertical height 179 whose magnitude is substantially one-fifth of the internal diameter 180 of the sheath 173 of the mechanism 170. The front plate 172 of the mechanism 170 has a substantially horizontal bearing housing 185 bolted to it which bearing housing is mounted on a support beam 186 that interconnects the forwardly convergent portions 155 and 156 of the two frame beams 153 and 154. The bearing housing 185 rotatably supports a shaft 187 by way of a pair of horizontally spaced apart ball bearings provided with fluid seals. The shaft 187 passes through a central hole in the front plate 172 of the mechanism 170 and a portion of said shaft is located inside that mechanism at the axial center thereof. As in the case of the embodiment described with reference to FIGS. 1 to 6 of the accompanying drawings, that portion of the shaft 187 that is located inside the mechanism 170 is provided with four flails 188 which incorporate blades having cutting edges at their outermost ends. The four flails 188 are pivotally connected to the previously described square plates 111 by the four shafts 112 that extend parallel to the longitudinal axis (axis of rotation) of the shaft 187 at 90° intervals around that axis. The leading end of the shaft 187 with respect to the direction 169 projects forwardly from the front of the bearing housing 185 and is there formed with coupling splines 189 to enable it to be placed in driven connection with the power take-off shaft (not visible) of the tractor 163 by way of a telescopic transmission shaft 190 that is of a construction which is known per se having universal joints at its opposite ends.

Two delivery ducts 191 and 192 (FIG. 9) open into the sheath 173 of the mechanism 170 at diametrically opposite sides of the central shaft 187 and at substantially the same horizontal level as that shaft. Both ducts 191 and 192 initially extend horizontally away from the mechanism 170 towards the opposite sides of the implement but are then curved forwardly so as to extend parallel or substantially parallel to the direction 169. The two ducts 191 and 192 are provided, where they first extend parallel or substantially parallel to the direction 169, with corresponding shut-off valves 193 and 194, said valves 193 and 194 being arranged to be opened and closed by corresponding control levers 195 and 196 to which their operating members are pivotally connected, said levers 195 and 196 extending generally forwardly with respect to the direction 169 from pivotal mountings 197 thereof which are positioned on top of the two delivery ducts 191 and 192. Delivery tubes 200 and 201 extend forwardly from the fronts of the two shut-off valves 193 and 194 and incorporate substantially 90° bends, said delivery tubes being arranged so as to be turnable relative to the valves 193 and 194 about corresponding axes 199 (FIG. 8) which both extend substantially horizontally parallel to the direction 169. Thus, one end of each of the two delivery tubes 200 and 201 remains substantially horizontally disposed while the other end thereof can be directed either upwardly as shown in full lines in FIG. 8 of the drawings in respect of the tube 200 or downwardly as shown in broken lines in the same Figure for the same delivery tube 200. It is also possible for the directionally displaceable ends of the tubes 200 and 201 to be orientated laterally with respect to the direction 169, that is to say, more or less perpendicular to the plane of FIG. 8 of the drawings.

The implement includes two spreading members 205 and 206 which are identical or substantially identical to the previously described spreading members 75 to 78 inclusive. The two spreading members 205 and 206 are arranged at the rearmost extremities of rear end portions 207 and 208 of delivery pipes 209 and 210 respectively. The two pipes 209 and 210 both extend substantially parallel to the direction 169 close to the bottom 178 of the tank 151 throughout the greater portions of their lengths but it will be seen from FIG. 7 of the drawings that the rear end portions 207 and 208 thereof are bent over outwardly through angles 211 that preferably both have a magnitude of substantially 30°.

The two delivery pipes 209 and 210 are bent over upwardly just in advance of the front wall 175 of the tank 151 to form portions 212 and 213 which are in a gently upwardly convergent relationship. The two upwardly bent-over portions 212 and 213 both have a vertical extent which is substantially the same as the vertical distance 89 (FIG. 2) through which the end portions 81, 82, 95 and 96 of the pipes 79, 80, 90 and 91 extend. The top of the tank 151 is provided substantially midway along its length with a filler opening 215 with which co-operates a pivotably mounted cover 216 having a locking latch. In this embodiment, flexible delivery hoses 220 and 221 are releasably connected by clips 228 or the like to the positionally adjustable ends of the corresponding delivery tubes 200 and 201. The ends of the hoses 220 and 221 that are remote from the delivery tubes 200 and 201 are releasably secured by further clips 222 or the like to the upper ends of tubular injectors 223 that form parts of a soil cultivating implement 224. The implement 224 includes two injection tines 225 that are spaced apart from one another laterally of the direction 169, a corresponding one of the two tubular injectors 223 being secured to each tine 225 at the rear thereof with respect to said direction 169. The soil cultivating implement 224 comprises a coupling member that is of generally triangular configuration when seen in front or rear elevation and that is arranged for pivotal connection to a rear mounted three-point lifting device or hitch of the tractor 163 in the manner that is illustrated in outline in FIGS. 7 and 8 of the drawings. The positionally adjustable ends of the two delivery tubes 200 and 201 both carry apertured fastening lugs 226 to which corresponding distributing plates 227 can be releasably secured as shown in broken lines in FIG. 8. When the spreading members 205 and 206 are to be used instead of the injectors 223 or the distributing plates 227, the clips 222 or the like are loosened to enable the hoses 220 and 221 to be disconnected from the upper ends of the tubular injectors 223 and the same clips 222 or the like are employed to couple said hoses 220 and 221 to the open ends of the upwardly bent-over portions 212 and 213 of the delivery pipes 209 and 210 as is shown in FIG. 8 of the drawings in broken lines for the hose 220.

When the spreading implement of FIGS. 7 to 10 of the drawings is to be used, the coupling fork 160 at the leading end of its draw bar 159 is turnably connected to the towing eye 162 of the tractor 163 by the substantially vertically disposed pivotal hitch pin 161. The tank 151 is completely filled, or filled to the required extent, by way of the opening 215 at its top, said opening then being closed, in a non-sealing manner to allow the ingress of air, by the cover 216. The two control levers 195 and 196 are, during filling, maintained in such positions that the corresponding shut-off valves 193 and 194 remain closed. The spreading implement of FIGS. 7 to 10 of the drawings is similar to the implement of FIGS. 1 to 6 thereof inasmuch as it is particularly suitable for spreading organic manure mixtures over the land, such mixtures usually containing undissolved solid constituents such as straws, lumps of manure, plant debris and so on. When the tractor 163 has towed the implement to the field or other area of land that is to have the contents of the tank 151 distributed onto or into its soil, the shutoff valves 193 and 194 are opened and the material from the interior of the tank 151 commences to flow, under gravity and the centrifugal pumping action of the mechanism 170, to the ducts 191 and 192, the openings 176 and 177 which interconnect the interior of the tank and the mechanism 170 being in constant unimpeded communication. The power take-off shaft of the tractor 163 drives the shaft 187 by way of the intermediate telescopic transmission shaft 190 so that said shaft 187 revolves in the direction indicated by an arrow in FIG. 9 of the drawings. The material that enters the mechanism 170 by way of the openings 177 and 176 is immediately attacked by the rapidly rotating flails 188 and the mechanical impacts of those flails against solid constituents of the material rapidly break up those solid constituents into much smaller pieces. Any lumps of material which catch momentarily in the mouths of the ducts 191 and 192 are repeatedly struck by the cutting edges of the blades which are incorporated in the flails 188 and are thus cut down to a size which enables them readily to pass through said ducts. The rapid rotation of the flails 188 exerts centrifugal forces on the material, and particularly the solid constituents thereof, within the mechanism 170 so that said solid constituents tend to move along the curved inner wall of the sheath 173 where they are particularly subject to the action of the cutting edges of the flail blades. Moreover, as previously mentioned, the rotary movement of the flails 188 produces a centrifugal pumping effect so that material is sucked from the tank 151 into the mechanism 170 and is pumped outwardly therefrom, under some pressure, through the delivery ducts 191 and 192. Thus, as soon as the valves 191 and 194 are open, the material from the tank 151, comminuted to such an extent that solid undissolved constituents thereof are sufficiently small to pass readily through the ducts 191 and 192, flows through said ducts and through the open shut-off valves with very little risk of any more than momentary blockage occurring.

Figure 8:
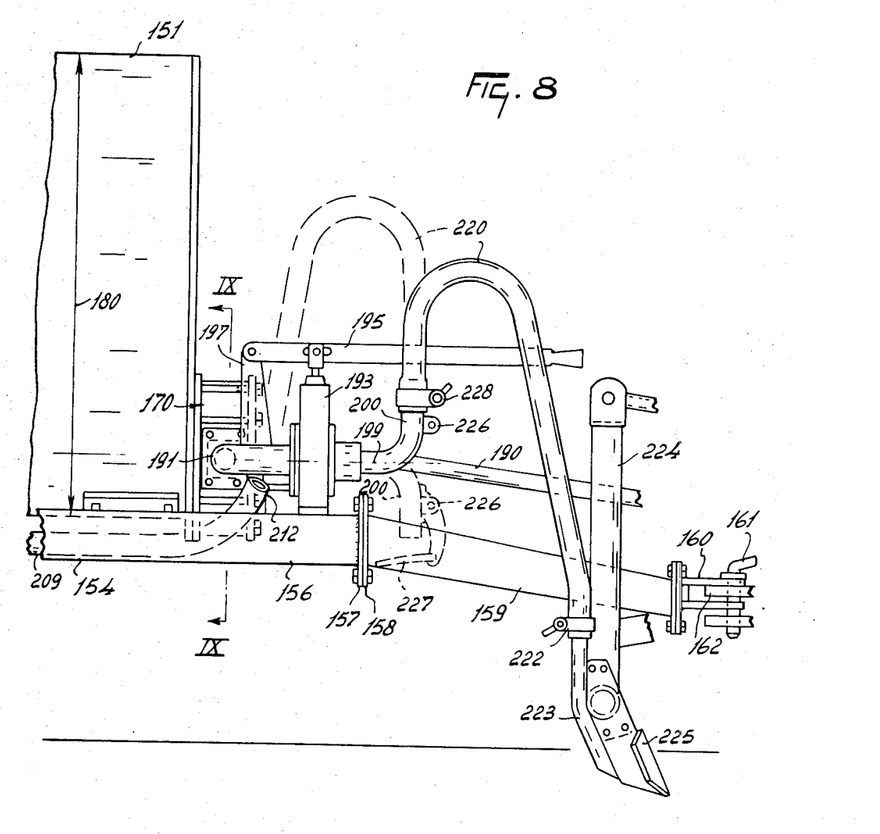
FIG. 8 is a side elevation, to an enlarged scale, of leading parts of the implement as seen in the direction indicated by an arrow VIII in FIG. 7.

When the hoses 220 and 221 are arranged as shown in FIG. 7 of the drawings and as shown in full lines in FIG. 8 thereof, the angularly adjustable ends of the delivery tubes 200 and 201 are upwardly orientated and the material flows through them to the injectors 223 via said hoses 220 and 221. With the injection tines 225 arranged so as to penetrate downwardly into the surface of the soil over which the implement is moving in the direction 169, the material issues from the injectors 223 wholly or principally below ground surface and is thus injected into the soil at two locations which are spaced apart laterally from one another with respect to the direction 169 on the implement 224 and thus at the front of the spreading implement (see FIG. 7). As in the embodiment of FIGS. 1 to 6 of the drawings, the soil cultivating implement 224 is upwardly and downwardly adjustable in position relative to the tractor 163 entirely independently of the spreading implement, the injectors 223 being connected to the spreading implement by the flexible hoses 220 and 221 which thus constitute movable connections which allow for changes in position of the soil cultivating implement 224 relative to the spreading implement.

If desired, the spreading members 205 and 206 at the rear of the implement with respect to the direction 169 may be employed instead of the injectors 223. In this case, the material is spread principally onto, rather than principally into, the soil throughout a broad strip of land having a width which is considerably greater than that of the path of travel of the implement itself. The respective members 205 and 206 distribute the material to strips of land that lie at opposite sides of a vertical plane 229 of substantial symmetry of the implement that extends parallel to the direction 169. All that is necessary to enable the material to be distributed by the spreading members 205 and 206 instead of by the injectors 223 is to release the clips 222 or the like to enable the ends of the hoses 220 and 221 to be disconnected from the injectors 223 after which said hoses are placed in positions corresponding to the position that is indicated in broken lines for the hose 220 in FIG. 8 and the clips 222 are employed to couple the ends of said hoses 220 and 221 releasably but sealingly to the free ends of the upwardly bent-over portions 212 and 213 of the delivery pipes 209 and 210. Thus, the material pumped through the delivery ducts 191 and 192 by the centrifugal action of the mechanism 170 issues from the outlet or delivery ports at the rearmost ends of the pipe portions 207 and 208 and is sprayed downwardly towards the ground surface as a result of its impingement against the positionally adjustable distribution plates of the members 205 and 206, said members 205 and 206 being, it will be remembered, substantially identical to the previously described spreading members 75 to 78 inclusive.

A further alternative way of using the implement of FIGS. 7 to 10 of the drawings involves temporarily removing the hoses 220 and 221 by releasing the clips 222 and 228 or the like, turning the angularly adjustable ends of the delivery tubes 200 and 201 downwardly into the position illustrated for the tube 200 in broken lines in FIG. 8 and using the apertured fastening lugs 226 to secure the distributing plates 227 to said tubes in opposed relationship with the outlet or delivery ports at their downwardly directed ends. When the implement is in use, material issues quite rapidly from the outlet or delivery ports at the ends of the tubes 200 and 201 and strikes the upper surfaces of the corresponding distributing plates 227 thus causing the material to be spread from two laterally spaced apart locations near to the front of the implement over two strips of land that extend parallel to the direction 169, said strips being disposed at opposite sides of the vertical plane 229 of substantial symmetry of the implement. It will be noted from FIG. 8 of the drawings that the upper surfaces of the distributing plates 227 have a convex curvature of relatively large radius which assists in directing the material downwardly towards the ground over the respective strips and improves the uniformity of spreading.

As in the embodiment of FIGS. 1 to 6 of the drawings, the embodiment of FIGS. 7 to 10 thereof, when used in combination with the soil cultivating implement 224, comprises outlet or delivery ports that are spaced apart from one another at three different locations with respect to the direction 169. Said locations are afforded by the mouths of the injectors 223, by the open ends or ports of the tubes 200 and 201, and by the delivery ports (equivalent to the ports 130) that co-operate with the spreading members 205 and 206. In this case, both the ports at the ends of the tubes 200 and 201 and the ports at the ends of the delivery pipe portions 207 and 208 are provided with corresponding distributing plates. The outlet or delivery ports of the injectors 223 are located quite close to the distributing plates 227 at the front of the implement and the outlet or delivery ports at the ends of the pipe portions 207 and 208 are located at the rear of the implement with respect to the direction 169. The spreading members 205 and 206 are located at a lower horizontal level than is the tank 151 and project beyond the opposite lateral sides of that tank as seen in plan view (FIG. 7).

In the embodiment of FIGS. 7 to 10 of the drawings, there are only the two delivery ducts 191 and 192 in connection with the reducing or cutting mechanism 170 and it has been found that, when the implement does not include a pump equivalent to the pump 28 of the embodiment of FIGS. 1 to 6, the provision of only the two ducts 191 and 192 is advantageous for co-operation with the centrifugal pumping effect of the mechanism 170 itself since the pressure produced by that mechanism is adequate to produce a steady flow of the material down the two ducts 191 and 192 with the relative dimensions that are illustrated in the drawings. It is noted that it is, however, possible to provide delivery ducts additional to the ducts 191 and 192 without it also being necessary to furnish a pump equivalent to the pump 28 of the embodiment of FIGS. 1 to 6.

Although certain features of the spreading implements described or illustrated in the accompanying drawings or both are set forth in the following claims as inventive features, it is emphasized that the invention is not necessarily limited to those features and may include within its scope each of the parts of each spreading implement described or illustrated or both in the accompanying disclosure as may constitute inventive novelty individually and in various combinations.

I claim:

1. An implement for spreading liquid and semi-liquid materials comprising a tank for such materials supported on frame means, said frame means connected to a prime mover, said tank being in communication with material delivery means, said delivery means comprising at least one hose at each opposite side of said tank and driven means in communication with the interior of said tank to deliver material to each said hose, a corresponding pipe extending from the front to the rear of said tank with respect to the normal direction of forward travel of the implement, the rear ends of said pipes having outlet ports with spreading members including means for spreading material outwardly and rearwardly relative to said tank, a soil cultivator being positioned in front of said tank and interconnected to said prime mover, said cultivator having material injectors that extend into the ground, said hoses being alternatively connectable to said injectors and to said pipes, whereby material is adapted to be delivered into and onto the ground respectively.

2. An implement according to claim 1, wherein said cultivator is interconnected to said frame through said prime mover.

3. An implement according to claim 2, wherein said cultivator has coupling means for connection to the three point lift of the prime mover and said implement has a tow member that is pivoted to a draw bar of said prime mover.

4. An implement according to claim 1, wherein said injectors and spreading members comprise at least three outlet ports which are spaced apart from one another lengthwise along each side of said implement and cultivator.

5. An implement according to claim 4, wherein two of said outlet ports are located adjacent the rear of said tank.

6. An implement according to claim 5, wherein a third outlet port is located adjacent the front of said tank.

7. An implement according to claim 6, wherein there are at least two of said outlet ports that are spaced apart from one another in a direction that is substantially horizontally perpendicular to the direction of travel.

8. An implement according to claim 6, wherein there are at least two outlet ports which are spaced apart from one another adjacent the rear of said tank.

9. An implement according to claim 8, wherein there are four outlet ports adjacent the rear of the implement, at least two of which are located close to opposite lateral sides of said tank, when viewed in plan.

10. An implement for spreading liquid and semi-liquid materials in combination with a tractor comprising a tank for such materials supported on frame means, said frame means towed by said tractor, said tank being in communication with material delivery means, said delivery means comprising at least one outlet port and a material comminuting mechanism positioned between the front of said tank and said outlet port with respect to the normal direction of forward travel of said implement, said mechanism having blades which rotate proximate an entrance into said mechanism to cut up solid substances in said material as received from said tank, said delivery means including delivery pipes with inlet ports proximate said outlet port and each pipe having a corresponding outlet port with first distribution means including a respective spreading member including means for spreading said material outwardly and rearwardly relative to said tank that is located adjacent the rear of said tank, further distribution means comprising at least one injector for injecting said material into the underlying soil carried by said tractor between said tank and said tractor, a flexible hose connected to said delivery means, said hose selectively connectable to said first distribution means or said further distribution means.

11. An implement according to claim 10, wherein said spreading member comprises a distributing plate, at least part of said plate being located at a level above that of the corresponding outlet port whereby material issuing from the port will strike the lower surface of said plate.

12. An implement according to claim 10, wherein there are at least two said spreading members adjacent the rear of said tank.

13. An implement according to claim 12, wherein said spreading members are located directly behind the rear of said tank when seen in plan.

14. An implement according to claim 10, wherein there are at least two said spreading members which are located laterally of the tank when the implement is viewed in plan.

15. An implement according to claim 14, wherein said two spreading members are connected to end portions of corresponding delivery pipes and said portions are bent outwardly away from the implement, said pipes extending forwardly along the tank from the bent-over portions thereof to the front of the implement.

16. An implement according to claim 15, wherein said two spreading members are located outwardly beyond the opposite lateral sides of said tank, forwardly from the rear end thereof.

17. An implement according to claim 10, wherein said first distribution means is connectable to said hose and a further like hose via releasable connections to front portions of said pipes.

18. An implement according to claim 17, wherein said delivery means comprises tubes which are turnably mounted on said mechanism.

19. An implement according to claim 18, wherein said tubes are bent substantially 90° with respect to the parts thereof that are mounted on said mechanism.

20. An implement according to claim 10, wherein the spreading members include plates that are pivoted to said pipes and turnable about substantially horizontal axes.

21. An implement according to claim 20, wherein, when arranged in their operative positions, said plates co-operate with downwardly directed parts of said pipes and material issuing from those pipes strikes upper surfaces of said plates and is spread downwardly.

22. An implement for spreading liquid and semi-liquid materials comprising a tank for such materials supported on frame means, said tank being in communication with material delivery means, said delivery means comprising at least one outlet port and a material reducing mechanism positioned between said tank and said outlet port, said mechanism including an inlet duct, and outlet duct, at least one rotatable cutter and driving means engaging said cutter to move same and comminute material being communicated to said outlet port, said inlet duct being located to introduce material into said mechanism substantially at a tangent to the outer circumference which is circumscribed by the rotation of said cutter and having a cutting edge mounted therein spaced outwardly of and closely proximate said circumference which is disposed substantially radially relative to said circumference whereby it cooperates with said cutter to sever solid material received in said inlet duct.

23. An implement according to claim 22, wherein said cutter is a rotary blade which cooperates with said cutting edge to cut up solid undisolved constituents of said material entering said mechanism.

24. An implement according to claim 23, wherein a plurality of said cutters are rotatably mounted within a circular casing and each said cutter comprises a flail with a further cutting edge, said flail being pivotably connected to a rotary shaft of said driving means.

25. An implement according to claim 24, wherein each flail has a greater width at the outer end thereof than at the inner end thereof adjacent said rotary shaft.

26. An implement according to claim 24, wherein considered in a direction parallel to the axis of rotation of said shaft, each flail has a width at the outer end thereof substantially equal to the internal width of said casing.

27. An implement according to claim 24, wherein an outer end region of each flail is a curved flail blade.

28. An implement according to claim 27, wherein each curved flail blade is orientated forwardly with respect to its normal direction of operative rotation.

29. An implement according to claim 24, wherein the width of the outer end of each flail has a length substantially one quarter of that of the internal diameter of said casing.

30. An implement according to claim 24, wherein said mechanism comprises two readily removably wall plates and a substantially cylindrical sheath between said plates, said plates and sheath forming a substantially right circular cylindrical casing.

31. An implement according to claim 30, wherein a duct member interconnects said tank to the mechanism and said duct member enters a curved wall of said sheath at said inlet duct.

32. An implement according to claim 31, wherein the longitudinal axis of said duct member extends substantially tangential to said sheath.

33. An implement according to claim 31, wherein said first mentioned cutting edge is positioned in said inlet duct at the connection between said duct member and said sheath.

34. An implement according to claim 33, wherein said first mentioned cutting edge is comprised by a blade that is substantially radially positioned relative to said shaft.

35. An implement according to claim 33, wherein said first mentioned edge is comprised by a blade that is secured to said casing by releasable fastening means.

36. An implement according to claim 33, wherein said sheath includes a bottom and said duct member is connected to said bottom of said sheath.

37. An implement according to claim 33, wherein said first mentioned cutting edge is located at a side of said inlet which is remote from said tank.

38. An implement according to claim 22, wherein said delivery means has at least two outlet ports in communication with said mechanism and extending radially from said circumference.

39. An implement according to claim 22, wherein said tank and mechanism are interconnected by a conduit leading to said inlet duct.

40. An implement according to claim 34, wherein said conduit is connected to a downwardly extending outlet of said tank.

41. An implement according to claim 20, wherein a pump is connected to an inlet tube that communicates with the interior of said tank, said pump having a control to produce a pressure in said tank different from ambient pressure.

42. An implement according to claim 22, wherein pump means are provided for controlling the absolute pressure in said tank is located behind said mechanism with respect to the normal direction of forward travel of said implement.

43. An implement according to claim 42, wherein said pump means for controlling the absolute pressure in said tank is mounted on said frame adjacent the front of said tank with respect to the normal direction of forward travel of said implement.

44. An implement according to claim 43, wherein said mechanism is fastened to beams of said frame that support the tank, said beams having leading ends and said pump means being located adjacent those ends.

45. An implement according to claim 22 wherein said mechanism has a substantially cylindrical sheath and at least two delivery ducts are connected to said outlet port and a further outlet port in said sheath.

46. An implement according to claim 45 wherein said outlet ports are located at the same level at substantially diametrically opposite sides of said sheath.

47. An implement according to claim 46, wherein there is a pair of delivery ducts connected side-by-side to each of said outlet ports.

48. An implement according to claim 47, wherein said pair of ducts is connected to a common delivery nozzle that is sealingly secured to said sheath in register with an outlet.

49. An implement according to claim 48, wherein said ducts extend outwardly side-by-side from a corresponding common delivery nozzle.

50. An implement according to claim 22 wherein said inlet duct has a lower aspect which is lower than the lower part of said circumference, said cutting edge being adapted to cooperate with said cutter to sever solids material received in said inlet duct, and being secured in said lower aspect of said inlet duct.

51. An implement for spreading liquid and semi-liquid materials comprising a tank for such materials supported on frame means, said tank being in fluid passage communication with material delivery means, said delivery means comprising at least one inlet port and at least two outlet ports and a material reducing mechanism positioned between said tank and said outlet ports, said mechanism comprising at least one cutter that is rotatably mounted to rotate about a substantially horizontal axis within a casing having a curved wall surface receiving said outlet ports and a substantially flat vertical side wall receiving said inlet port, said outlet ports extending radially from said wall surface relative to said horizontal axis, said inlet port being entirely located in said flat side wall at a height between the lower aspect of said casing and said horizontal axis, driving means engaging said cutter to rotate same and comminute material within said casing, at least the outer part of said cutter being positioned to move closely adjacent said wall during operation and to move material towards said outlet ports.

52. An implement according to claim 51, wherein said flat side wall overlies an outer flat wall of said tank.

53. An implement according to claim 52, wherein said flat side wall of said mechanism and the outer flat wall of said tank have aligned inlet openings comprising said inlet port.

54. An implement according to claim 53, wherein at least one of said inlet port is an oval opening.

55. An implement according to claim 54, wherein said oval opening has a horizontal width that is greater than its vertical height.

56. An implement according to claim 53, wherein the height of said inlet port in said flat side wall is about one-fifth that of said casing.

57. An implement according to claim 51, wherein said cutter comprises a plurality of cutting members, each said cutting member comprising a flail having pivotal axis which is parallel to and spaced from said horizontal axis.

58. An implement according to claim 51, wherein said casing comprises a substantially cylindrical sheath which is clamped sealingly between two flat plates, one of said plates comprising said flat side wall.

59. An implement according to claim 51, wherein said cutter is mounted on shaft means extending through and outside said casing, said shaft means outside said casing including means for connection to means for rotating same.

60. An implement according to claim 59, wherein bearing means for said shaft means is rigidly connected to beams of said frame.

61. An implement according to claim 60, wherein one end of said shaft means extends beyond said bearing means and that end has coupling means for connection to a power takeoff shaft of a prime mover.

62. An implement according to claim 51, wherein said mechanism has a substantially cylindrical sheath and at least two delivery ducts are connected to said two outlet ports in said sheath.

63. An implement according to claim 62, wherein said outlet ports are located at the same level at substantially diametrically opposite sides of said sheath.

64. An implement according to claim 62, wherein flexible hose means is coupled to said ducts.

65. An implement according to claim 64, wherein said hose means is releasably fitted on said ducts.

66. An implement according to claim 51, wherein said tank is connected to said mechanism by a duct member and the latter has a shut-off valve.

67. An implement according to claim 51, wherein there are respective delivery ducts connected to said outlet ports, each of said ducts having a corresponding shut-off valve.

68. An implement according to claim 51, wherein said frame means comprises beams that support said tank and said beams having leading ends that are connected to a draw bar for connection to a prime mover.

69. An implement according to claim 51, wherein said tank has a closable filler opening.

70. An implement according to claim 69, wherein said filler opening is located on top of said tank.

71. An implement according to claim 70, wherein the filler opening has a closing cover.

72. An implement according to claim 51 wherein the outer part of said one cutter is substantially wider than the remainder of said cutter, said inlet port being received inboard of the interior circumference circumscribed by said part of said cutter.

73. An implement for spreading liquid and semi-liquid materials comprising a tank for such materials supported on a frame means, said frame means connected to a prime mover, said tank being in communication with material delivery means, said material delivery means comprising at least one outlet port and means comprising at least one flexible delivery hose at each opposite side of said tank and driven means in communication with the interior of said tank to deliver material to each said delivery hose, a corresponding pipe for each said hose extending from the front to the rear of said tank with respect to the normal direction of forward travel of the implement, the rear ends of said pipes having outlet ports with spreading members, said spreading members including means for spreading material to the rear of said tank, a soil cultivator being positioned in front of said tank and connected to said prime mover, said cultivator having material injectors that extend into the ground, each of said hoses being alternatively connectable to said injectors and to said pipes whereby material is delivered into and onto the ground respectively, and a comminuter mechanism being disposed in association with said material delivery means between said tank and said flexible delivery hoses whereby material delivered to each said hose must pass through said comminuter mechanism which is adapted to cut up or otherwise comminute solid constituents of said material.

74. An implement for comminuting solid undissolved constituents of a material to be spread which comprises a vertically disposed casing having an inlet and at least two outlets, said inlet being disposed in the lower aspect of said casing, cutting means in said casing connected to a horizontal shaft also provided in said casing for rotation, said inlet connected to a duct which is located to introduce material into said casing substantially at a tangent to the outer circumference which is circumscribed by the rotation of said cutting means, a substantial portion of said inlet duct being lower than the lowest portion of said casing and having at its end in said inlet duct portion a cutting edge proximate to said circumference and at a substantial angle to said tangent as seen in a direction parallel to the axis of rotation of said horizontal shaft whereby solid material in said inlet duct portion between said cutting edge and said cutting means is severed.

75. An implement for spreading liquid and semi-liquid materials which comprises: a tank for containing said materials, a flat end vertically disposed wall included in said tank, an outlet opening at the lower aspect of said wall; frame means supporting said tank; material delivery means in fluid passage communication with said tank through said outlet opening, said material delivery means comprising a casing having an inlet port and at least one outlet port and a material reducing mechanism mounted between said inlet port and said outlet port, said material reducing mechanism comprising at least one cutter mounted to rotate about a substantially horizontal axis within said casing, said casing comprising a curved interior wall surface and a substantially flat vertical sidewall receiving said inlet port at a height spaced above the bottom of said casing and spaced below said horizontal axis, driving means engaging said cutter to rotate same and comminute material within said casing, the outer part of said cutter adapted to move closely adjacent said flat vertical sidewall and to move material toward said outlet port, said flat end vertically disposed wall being flush against said flat vertical sidewall and said outlet opening aligned with said inlet port.

76. An implement according to claim 75, wherein said inlet port extends substantially entirely about said cutter's outer part and the bottom of said casing's interior surface is spaced below the bottom in the interior of said tank, the lower aspects of said outlet opening and said inlet port being at least at low as the bottom in the interior of said tank.

77. An implement according to claim 76, wherein said outlet port and a further like outlet port are disposed in said casing midway between the bottom and top of the interior of said casing, said outlet ports extending radially relative to said horizontal axis.

78. An implement for spreading liquid and semi-liquid materials which comprises: a tank for holding said materials, a vertically disposed end wall included in said tank, an outlet opening at the bottom of said wall; frame means carrying said tank; material delivery means in fluid passage communication with said tank through said outlet opening, said material delivery means comprising a casing having an inlet port which has an oval configuration and is situated in the same plane as the bottom of said tank, at least one outlet port and a material reducing mechanism mounted between said inlet port and said outlet port, said material reducing mechanism comprising at least one cutter mounted to rotate about a substantially horizontal axis within said casing, said casing comprising a curved interior wall surface and a vertical side wall which includes said inlet port at a location between the bottom of said casing and said horizontal axis, driving means connected to said cutter to rotate same and comminute material within said casing, the outer part of said cutter adapted to move closely adjacent said vertical side wall and to move material towards said outlet port, said vertically disposed end wall being closely adjacent said vertical side wall and said outlet opening leading into said inlet port.

79. An implement according to claim 78, wherein said inlet port has a width greater than its height and extends substantially above said cutter's outer part and the bottom of said casing's interior surface is spaced below the bottom of the interior of said tank, the lower aspects of said outlet opening and said inlet port being at substantially the same level as the bottom of the interior of said tank.

80. An implement according to claim 79, wherein said outlet port and a further like outlet port are disposed in said casing midway between the bottom and top of the interior of said casing, said outlet ports extending radially in diametrically opposite directions relative to said horizontal axis.

81. An implement for spreading liquid and semi-liquid materials including a tank for containing said material, a material delivering mechanism which comprises a substantially cylindrical casing, an inlet port in fluid passage communication with the interior of said tank, a material reducing mechanism mounted to rotate in said casing about a horizontal axis concentric with said casing, said material reducing mechanism including a plurality of blades adapted to rotate about said axis for moving material into and from said casing, each said blade including an outwardly extending cutting part which rotates closely adjacent the interior of said casing for cutting solid materials received therein, a plurality of outlet ports in said casing and a delivery duct connected to said casing at each said outlet port whereby each said delivery duct extends substantially perpendicularly away from said casing at least in the immediate vicinity thereof whereby material moving from said casing into said duct abruptly changes direction by an angle of about 90°, the passageway of each said delivery duct having an equal cross-sectional area whereby the rate of material flowing through each delivery duct as a result of the rotation of such blades is substantially equal.

82. An implement according to claim 81 wherein said inlet port connects with a further duct which is substantially larger in cross-section than each of said first-mentioned ducts, the longitudinal axis of said further duct being substantially tangential to said casing, the extreme end of said further duct adjacent said casing being closed by a projection extending substantially at right angles outwardly of said casing and a cutting blade member included in said projection having a cutting edge closely adjacent the circumference described by the rotation of the outer end of each cutting part whereby solids in said material moving through said further duct agaist said projection are reduced by the cooperative cutting action of said cutting edge and each said cutting part during the rotation of the latter.

83. An implement according to claim 81, wherein said inlet port connects directly to an opening in the bottom of said tank, said inlet port being in a wall of said casing which is perpendicular to said horizontal axis and which is at a location below said horizontal axis and above the lowest aspect of said casing.

84. An implement according to claim 83, wherein each said cutting part is wider than the remaining portion of said blade whereby said remaining portion is spaced outwardly from said inlet port.

* * * * *